(12) United States Patent
Gutierrez et al.

(10) Patent No.: US 7,349,813 B2
(45) Date of Patent: Mar. 25, 2008

(54) FAULT TOLERANT POWER SYSTEM ARCHITECTURE FOR FLUID FLOW MEASUREMENT SYSTEMS

(75) Inventors: Francisco M. Gutierrez, League City, TX (US); Daniel J. Diaz, Katy, TX (US); Ronald James Hairston, Cypress, TX (US)

(73) Assignee: Dresser, Inc., Addison, TX (US)

( * ) Notice: Subject to any disclaimer, the term of this patent is extended or adjusted under 35 U.S.C. 154(b) by 38 days.

(21) Appl. No.: 11/434,977

(22) Filed: May 16, 2006

(65) Prior Publication Data
US 2007/0271044 A1 Nov. 22, 2007

(51) Int. Cl.
*G01F 22/00* (2006.01)
*G06F 17/40* (2006.01)
*G06F 17/00* (2006.01)

(52) U.S. Cl. ............................. 702/46; 73/149; 73/861; 73/861.79; 235/94 R; 340/606; 340/609; 340/693.1; 340/693.2; 702/45; 702/63; 713/300; 713/340

(58) Field of Classification Search ................... 73/149, 73/861, 861.01, 861.02, 861.03, 861.18, 73/861.21, 861.32, 861.33, 861.42, 861.52, 73/861.77, 861.79, 861.85; 235/94 R, 95 A, 235/94 A; 340/500, 501, 603, 606, 609, 340/610, 635, 636.1, 636.15, 636.19, 641, 340/693.1, 693.2; 702/1, 45, 46, 57, 60, 702/63, 64, 127; 713/300, 330, 340
See application file for complete search history.

(56) References Cited

U.S. PATENT DOCUMENTS

| | | | |
|---|---|---|---|
| 2,718,144 A | * | 9/1955 | Hornfeck .................. 73/861.02 |
| 2,954,692 A | * | 10/1960 | Hornfeck .................. 73/861.02 |
| 2,991,652 A | | 7/1961 | Bassett |
| 3,053,083 A | * | 9/1962 | Stough et al. ............ 73/861.02 |
| 3,176,514 A | * | 4/1965 | Foster ..................... 73/861.03 |
| 3,254,523 A | * | 6/1966 | Fisher ......................... 73/1.28 |
| 3,537,312 A | * | 11/1970 | Moore ..................... 73/861.03 |
| 3,543,093 A | * | 11/1970 | Linfield ....................... 361/88 |
| 3,555,902 A | | 1/1971 | Onoda et al. |
| 3,581,566 A | | 6/1971 | Goff et al. |
| 3,599,022 A | | 8/1971 | Adair |
| 3,685,353 A | | 8/1972 | Gestler et al. |
| 3,772,917 A | | 11/1973 | Lutz et al. |

(Continued)

FOREIGN PATENT DOCUMENTS

EP     0 136 187 A2 *  4/1985

(Continued)

*Primary Examiner*—Edward R Cosimano
(74) *Attorney, Agent, or Firm*—Fish & Richardson P.C.

(57) ABSTRACT

To provide a fault-tolerant architecture to supply electrical operating power in fluid flow measurement applications, apparatus and associated systems, computer program products, and methods include an intelligent power module with redundant and electrically independent battery strings to supply regulated voltage to electronic fluid flow measurement data processing circuitry. In a preferred implementation, the intelligent power module transmits operating power and battery status information over a two wire interface. Circuitry may encode information about the status of individual battery strings in a DC supply voltage. The fluid meter processing circuitry operates from the DC supply voltage and decodes the battery status information. Preferred embodiments may also include a switched-mode power supply capable of extracting substantially all available stored energy capacity from each of the battery strings, each of which is electrically isolated by a unidirectional current circuit.

29 Claims, 6 Drawing Sheets

U.S. PATENT DOCUMENTS

| | | |
|---|---|---|
| 3,820,090 A | 6/1974 | Wiegand |
| 3,867,618 A * | 2/1975 | Oliver et al. ................ 714/745 |
| 4,035,715 A * | 7/1977 | Wyman et al. ............. 323/268 |
| 4,084,124 A | 4/1978 | Kapustka |
| 4,150,314 A | 4/1979 | Zabler et al. |
| 4,204,249 A * | 5/1980 | Dye et al. .................... 713/330 |
| 4,247,601 A | 1/1981 | Wiegand |
| 4,263,523 A | 4/1981 | Wiegand |
| 4,265,127 A | 5/1981 | Onoda |
| 4,409,848 A | 10/1983 | Lutz |
| 4,593,209 A | 6/1986 | Sloan |
| 4,673,826 A * | 6/1987 | Masson ........................ 307/66 |
| 4,736,122 A | 4/1988 | Opie et al. |
| 4,743,780 A | 5/1988 | Opie |
| 4,758,742 A | 7/1988 | Opie |
| 4,793,192 A | 12/1988 | Jerger et al. |
| 4,931,947 A * | 6/1990 | Werth et al. ................. 700/297 |
| 5,028,861 A | 7/1991 | Pace et al. |
| 5,199,307 A | 4/1993 | Onoda et al. |
| 5,239,495 A * | 8/1993 | Nanno et al. ................ 713/321 |
| 5,283,513 A | 2/1994 | Fujita et al. |
| 5,383,140 A * | 1/1995 | Nanno et al. ................ 713/321 |
| 5,530,298 A | 6/1996 | Gerhold |
| 5,581,772 A * | 12/1996 | Nanno et al. ................ 713/340 |
| 5,610,450 A | 3/1997 | Saeki et al. |
| 5,633,572 A * | 5/1997 | Steele et al. ................. 361/728 |
| 5,656,915 A * | 8/1997 | Eaves ........................ 320/118 |
| 5,668,417 A * | 9/1997 | Wiscombe et al. ........... 307/64 |
| 5,773,966 A | 6/1998 | Steigerwald |
| 5,986,436 A | 11/1999 | Liu |
| 6,118,248 A | 9/2000 | Gartstein et al. |
| 6,140,927 A * | 10/2000 | Whitmire ............... 340/636.15 |
| 6,191,687 B1 | 2/2001 | Dlugos et al. |
| 6,268,710 B1 * | 7/2001 | Koga ......................... 320/116 |
| 6,523,427 B1 | 2/2003 | Ferguson |
| 6,612,188 B2 | 9/2003 | Hamilton |
| 6,677,759 B2 * | 1/2004 | Friel et al. ................... 324/430 |
| 6,693,431 B1 * | 2/2004 | Leyde et al. ................. 324/434 |
| 6,703,722 B2 * | 3/2004 | Christensen ................. 307/71 |
| 6,727,679 B2 | 4/2004 | Kovarik et al. |
| 6,760,618 B1 | 7/2004 | Inoue |
| 6,835,491 B2 | 12/2004 | Gartstein et al. |
| 6,886,414 B2 | 5/2005 | Gutierrez |
| 6,949,924 B2 | 9/2005 | Lewis |
| 6,983,212 B2 * | 1/2006 | Burns ......................... 702/63 |
| 7,015,674 B2 | 3/2006 | VonderHaar |
| 7,038,333 B2 | 5/2006 | Bourilkov et al. |
| 2001/0020802 A1 * | 9/2001 | Kitagawa et al. ............. 307/66 |
| 2001/0024109 A1 * | 9/2001 | Sobkow et al. ............. 323/225 |
| 2002/0163339 A1 * | 11/2002 | Friel et al. ................... 324/434 |
| 2003/0111908 A1 * | 6/2003 | Christensen ................. 307/43 |
| 2004/0010649 A1 * | 1/2004 | Weaver et al. ............. 710/302 |
| 2005/0127871 A1 | 6/2005 | Orikasa |
| 2005/0191528 A1 | 9/2005 | Cortes et al. |
| 2006/0012341 A1 * | 1/2006 | Burns ......................... 320/132 |
| 2007/0271044 A1 * | 11/2007 | Gutierrez et al. ............. 702/45 |

FOREIGN PATENT DOCUMENTS

JP  09215244 A  8/1997

* cited by examiner

| Battery String 1 | Battery String 2 | Battery String 3 | Voltage |
|---|---|---|---|
| Faulted | Faulted | Faulted | 5.4 |
| Faulted | Faulted | Good | 5.3 |
| Faulted | Good | Faulted | 5.2 |
| Faulted | Good | Good | 5.1 |
| Good | Faulted | Faulted | 5.0 |
| Good | Faulted | Good | 4.9 |
| Good | Good | Faulted | 4.8 |
| Good | Good | Good | 4.7 |

FAULT TOLERANT POWER SYSTEM ARCHITECTURE FOR FLUID FLOW MEASUREMENT SYSTEMS

TECHNICAL FIELD

Various embodiments relate to fluid flow measurement systems, and particular embodiments relate to reliability of power systems for operating equipment in fluid flow measurement applications.

BACKGROUND

Fluids, which may be in liquid or gas state, are often transported, distributed, and/or sold to customers through a system of transmission and distribution lines. For purposes such as billing and inventory control, for example, fluid flow measurement systems may be installed at various locations along these lines. Gas metering systems, for example, may measure the volume of gas that flows through a particular gas line. Fluid measurement systems typically include a fluid flow meter and an electronic or mechanical indicator or index.

As an illustrative example, one type of fluid flow meter is a rotary meter for measuring a volume of gas through a gas line. In some rotary meters, gas flowing through the meter causes a set of impellers to rotate within a cylinder. This type of meter is normally referred to as a rotary positive displacement meter. As the impellers turn, they measure a displaced volume of gas that is fixed and determined by the area between the impeller and cylinder. Each impeller rotation indicates that a certain volume of gas has flowed through the meter. This is normally referred to as "actual" volume as measured by the primary flow element that is in this case a rotary positive displacement meter. Buying and selling of natural gas typically requires that the actual volume be converted to "standard" volume to account for the contraction or expansion of gas due to varying gas pressure and gas temperature. In general, these effects may be described by Boyle's and Charles' Law. To convert actual volume to standard volume, some gas metering systems use an electronic volume corrector to correct actual volume measurement originating from the rotating impellers to account for temperature or pressure of the gas in the meter.

In general, fluid flow measurement systems often can be applied in harsh conditions, subject to extremes in temperatures, weather, contaminants, and/or mechanical vibration. Furthermore, some fluid flow measurement systems may be installed in locations that are remote or otherwise difficult to access for maintenance purposes. Moreover, electronics to provide volume correction functions consume electrical power for which batteries may be the only readily available source.

Accordingly, maintaining fluid flow measurement systems that operate from battery power can require battery related maintenance. Batteries can have various electrical and/or mechanical failure mechanisms. For example, batteries can develop leaks, depleted charge, short circuits, overheating, high internal resistance, or open circuits. Moreover, contacts may fail to provide sufficient continuity to the battery terminals due to contamination or vibration. A significant portion of the lifetime cost of maintaining some liquid and gas fluid flow measurement systems may be attributable to battery-related faults.

SUMMARY

To provide a fault-tolerant architecture to supply electrical operating power in fluid flow measurement applications, apparatus and associated systems, computer program products, and methods include an intelligent power module with redundant and electrically independent battery strings to supply regulated voltage to electronic fluid flow measurement data processing circuitry. In a preferred implementation, the intelligent power module transmits operating power and battery status information over a two wire interface. Circuitry may encode information about the status of individual battery strings in a DC supply voltage. The fluid meter processing circuitry operates from the DC supply voltage and decodes the battery status information. Preferred embodiments may also include a switched-mode power supply capable of extracting substantially all available stored energy capacity from each of the battery strings, each of which is electrically isolated by a unidirectional current circuit.

Various implementations of the intelligent power module, and associated systems, methods, and computer program products, provide features to reduce maintenance requirements related to, for example, faulted batteries and/or intermittent electrical contacts that can result from vibrations in the fluid flow system.

Some embodiments may have one or more advantages. For example, fault tolerance of electrical measurement devices exposed to rugged field installation conditions, such as vibration and corrosion, may be improved. Sensitivity to single point faults in the power supply systems, for instance, may be reduced. Some embodiments may provide improved utilization of a stored energy source, thereby extending operational life of a system. Furthermore, some embodiments may provide monitoring and reporting capabilities that may reduce unnecessary maintenance-related labor and materials expenses, help to identify points of failure, and/or promote increased system availability.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EXAMPLES

Figure 1:
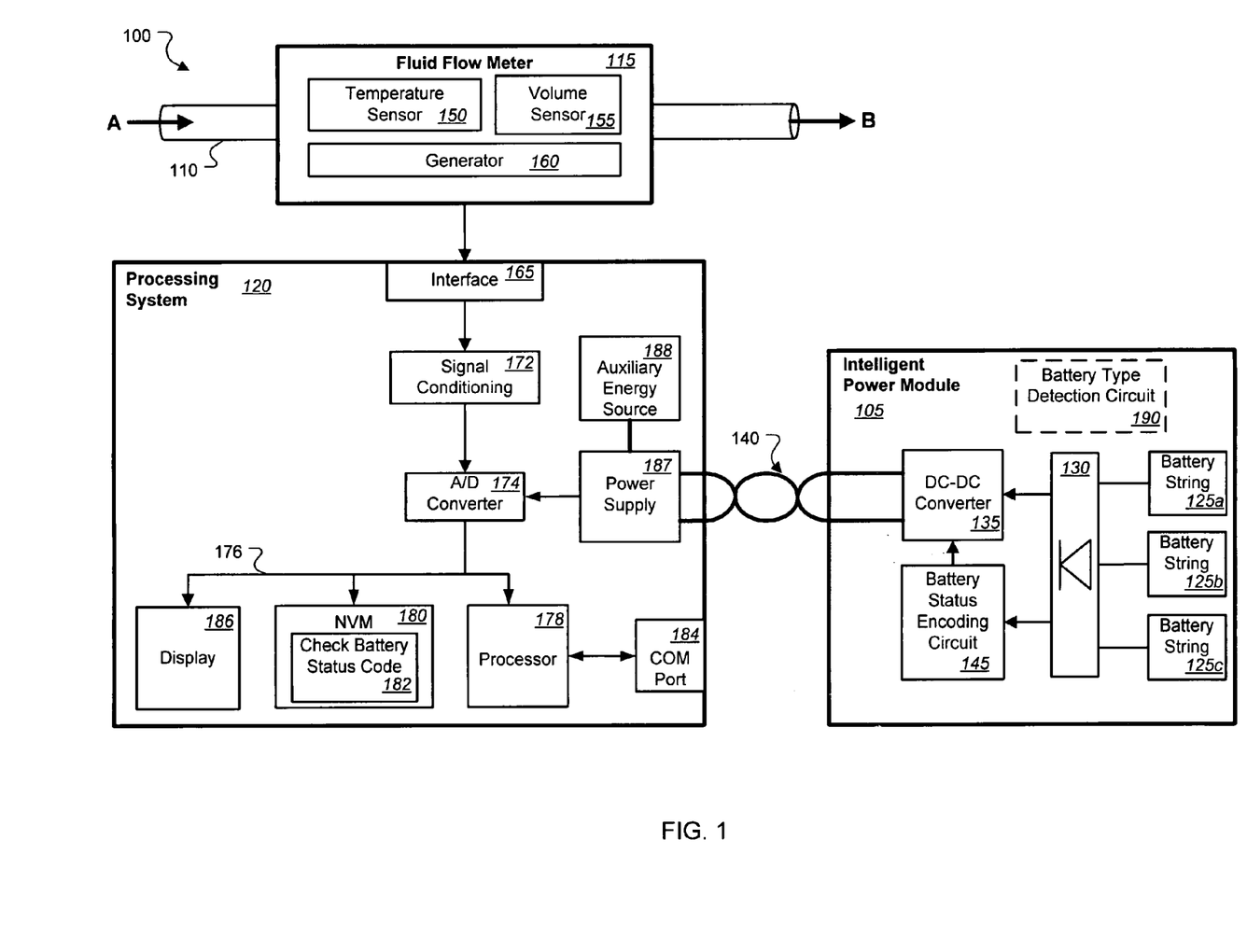
FIG. 1 shows an exemplary fluid flow measurement system with an intelligent power module.

FIG. 1 shows an exemplary fluid measurement system 100 that includes an intelligent power module 105, a fluid line 110, a fluid flow meter 115, and a processing system 120. In this example, fluid, which may be in gas or liquid form, flows in the fluid line 110 in the direction indicated by arrows A and B. The volume of fluid that flows through the fluid line 110 is measured by the fluid flow meter 115, which may be a gas flow meter or a liquid flow meter, for example. The measured data is processed by the processing system 120 that operates using electrical power from the intelligent power module 105. Examples of the processing system 120 may be a fluid flow accumulator, totalizer, corrector, or similar fluid flow measurement processing device.

In various embodiments, the intelligent power module 105 may substantially increase reliability of the fluid measurement system 100, for example, by providing redundant power supplies with a reduced susceptibility to single or multiple faults, such as an intermittent electrical contact (e.g., due to contamination, oxidation, vibration, etc). Battery status information may be read remotely or locally to permit preventative replacement, or so that faulted battery strings can be identified and replaced during regular maintenance operations.

The intelligent power module 105 includes multiple independent battery strings 125a, 125b, 125c, a unidirectional current circuit 130, and a DC-DC converter 135. The battery strings 125a, 125b, 125c are independently connected in parallel to the unidirectional current circuit 130 such that current supplied by each of the battery strings 125a, 125b, 125c flows substantially in a preferential direction. The fluid measurement system 100 includes a two wire link 140 to transmit both data and power signals from the intelligent power module 105 to the processing system 120. The transmitted data signal may include encoded signals that indicate a status of each of the battery strings 125a, 125b, 125c. For example, the battery status information may contain information that identifies which of the battery strings are faulted.

The battery strings 125a, 125b, 125c can each independently supply power to the DC-DC converter 135 via the unidirectional current circuit 130. When at least one battery string is operational, the DC-DC converter 135 regulates power supplied to the processing system 120 at a preferential voltage level using voltage supplied by the battery strings 125a, 125b, 125c. The intelligent power module 105 then transmits the power through the two wire link 140 to the processing system 120 for operation.

The two wire link 140 can also transmit data signal from the intelligent power module 105 to the processing system 120. In this example, the intelligent power module 105 includes a battery status encoding circuit 145. The battery status encoding circuit 145 can generate an encoded signal that includes battery status information. For example, the battery status encoding circuit 145 may be implemented to encode information to identify which battery strings are faulted. Upon receiving the encoded signal via the two wire link 140, the processing system 120 may retrieve information encoded in the signal. For example, the processing system 120 may identify the faulted battery strings and notify maintenance personnel which battery strings have failed or are approaching failure.

In some implementations, the fluid line 110 can be a gas line that transports gasses, such as natural gas, argon, butane, carbon monoxide, carbon dioxide, ethane, nitrogen, oxygen, propane, or air. In other implementations, the fluid line 110 can be a liquid line that transports water, crude oil, petroleum, gasoline, chemical solutions, or waste water. The fluid flow meter 115 includes a temperature sensor 150, a volume sensor 155, and optionally a generator 160. When fluid flows through the fluid flow meter 115, the fluid flow meter 115 measures fluid flow information, such as pressure and temperature in the fluid line 110. Then the fluid flow meter 115 communicates the measured information to the processing system 120. The processing system 120 receives the signals via an interface 165 (which may include electrical and/or mechanical) to determine a quantity of fluid, such as a volume of gas, flowing through the fluid flow meter 115. For example, the processing system 120 may use the temperature information from the temperature sensor 150 to convert actual gas volume to standard gas volume based on Charles' Law.

The generator 160 converts mechanical energy from the fluid flow into electrical energy. For example, the fluid flow meter 115 may measure the pressure of the fluid flow using rotating impellers. The generator 160 may then use the energy in the rotation impellers to independently generate electricity to power the processing system 120, either alone or in combination with power supplied by the power module 105. Some embodiments of the generator 160 are described in co-pending U.S. Patent Application assigned to the same assignee as Ser. No. 10/419,522 now U.S. Pat. No. 6,886,414, to Gutierrez et al., entitled "Power Generating Meter," and filed on Apr. 21, 2003, the entire contents of which are incorporated herein by reference.

The received signals, such as the line pressure, the temperature, and the volume signals, are processed by a signal conditioning circuit 172 and an A/D converter 174. The signal conditioning circuit 172 may include analog amplification and/or scaling to modify the input signal for interfacing to the A/D converter 174. As shown, the A/D converter 174 processes analog signals, either through the signal conditioning circuit 172 or a power supply 187. Although not illustrated, the A/S 174 may receive signals from the fluid flow meter 115 or the intelligent power module 105, including an input voltage to the power supply 187. For example, the A/D converter 174 may receive the encoded signal from the intelligent power module 105. The A/D converter 174 outputs a serial or parallel output signal of data representing samples of the input signal(s) onto a digital bus 176. The bus 176 couples to a processor 178 and a non-volatile memory (NVM) 180. The processor 178 may include one or more processing devices that are operable to execute instructions (i.e., software, firmware) to perform operations. For example, the processor 178 may include a microcontroller, microprocessor, DSP, and/or math co-processor. The NVM 180 may store program, control, data, metadata, and/or other information for access by the processor 178. For example, the processor 178 may access instructions stored in the NVM 180, such as a check battery status code 182. The processor 178 may perform instruction in the check battery status code 182 to determine which, if any, of the battery strings 125a, 125b, 125c are faulted.

The processing system 120 also includes a COM port 184. In some implementations, the COM port 184 may provide two-way communication with other devices. For example, the COM port 184 may be used to link to a download terminal of, for example, a laptop, or a handheld computer, to send collected measurement and/or maintenance request signals. In another example, an external device may send instructions, such as a check battery status instruction, to the processing system 120 via the COM port 184. Upon receiving the check battery status instruction, the processor 178 may perform the check battery status code 182 to check the status of the battery strings 125a, 125b, 125c. Then the processor 178 can send the result to the device using the COM port 184. In some embodiments, the COM port 184 may communicate with the external device using a wireless interface, such as a wireless network interface card (WNIC) to connect to a radio based network, or an Infrared (I/R) interface. In other embodiments, the COM port 184 may connect to the external device via, for example, a Universal Serial Bus (USB) interface.

The processing system 120 also includes a display 186, such as a liquid crystal display (LCD) monitor, a thin-film transistor (TFT) monitor, or a Light-emitting diode (LED) screen. The processor 178 can transmit text messages and/or graphical messages to the display 186. For example, when a battery string needs replacement, the processor 178 may display an alert message on the display 186 to indicate which battery string requires service.

The processing system 120 further includes the power supply 187 to supply regulated power for operation. The power supply 87 connects via the two-wire link 140 to the intelligent power module 105. The processing system 120 receives electrical power from the intelligent power module 105 through the power supply 187. The power supply 187 can also provide data signals to the processing system 120. For example, the power supply 187 may receive an encoded data signal from the intelligent power module 105 that includes battery status information. In other implementations, the processing system 120 may receive power and data signals from the intelligent power module 105 over different transmission paths.

In the intelligent power module 105, the DC-DC converter 135 may be a switched mode power supply that regulates voltage level of an output and transmits encoded signals to the processing system 120. For example, the DC-DC converter 135 may include a switching regulator that switches the load current rapidly on and off in order to control the output voltage. In some implementations, a boost converter, a buck-boost converter, a flyback converter, a forward converter, a resonant converter, a Ćuk converter, a charge pump, or a SEPIC converter may be used in place of the DC-DC converter 135. One or more parallel or cascade switched mode supplies may be used, in combination with linear regulators, such as shunt or series regulators, and may include low dropout regulators (LDO).

The DC-DC converter 135 receives electrical power from the battery strings 125*a*, 125*b*, 125*c* via the unidirectional current circuit 130. The unidirectional current circuit 130 substantially limits electrical currents to unidirectional flow from each of the battery strings 125*a*, 125*b*, 125*c* to the DC-DC converter 135. In one example, the unidirectional current circuit 130 may include diodes, such as Schottky diodes. Other examples of the unidirectional current circuit 130 may be MOSFET diodes or other semiconductor controlled switches configured to provide unidirectional flow. Each of the battery strings 125*a*, 125*b*, 125*c* may include one or more battery cells connected in series. For example, the battery strings 125*a*, 125*b*, 125*c* may include two, three or more C cells, D cells, or other battery cells connected in series and/or parallel. In some embodiments, the battery strings the battery strings 125*a*, 125*b*, 125*c* may use chargeable batteries, such as lithium or other primary batteries, such as alkaline batteries. Although three battery strings 125*a*, 125*b*, 125*c* are shown in this example, two, four, five, or other number of battery strings can be included in the intelligent power module in other implementations.

In some embodiments, the DC-DC converter 135 may provide a voltage boost when the voltage output of the DC-DC converter 135 is lower than a predefined threshold, such as a reference voltage. For example, the voltage output of the DC-DC converter 135 may drop when some batteries in the battery strings 125*a*, 125*b*, 125*c* reach near the end of the battery life. The DC-DC converter 135 is configured to detect the voltage drop at the output and boost the voltage output to be substantially equal to the reference voltage.

During operation, some of the battery strings 125*a*, 125*b*, 125*c* may fail due to, for example, poor electrical contacts between the serially connected batteries, or between a battery string and the unidirectional current circuit 130. As an example, a contact between a battery string and the unidirectional current circuit 130 may be contaminated when dirt or dust accumulates at the contact area. As another example, vibration of the intelligent power module 105 may displace some of the battery strings 125*a*, 125*b*, 125*c*, and disconnect the displaced battery strings 125*a*, 125*b*, 125*c* from the rest of the circuit. As another example, a battery string may be faulted if the battery string includes a leaking battery.

The battery status encoding circuit 145 is configured to encode various battery status information. For example, the battery status encoding circuit 145 may encode the status of a battery string in the encoded signal. In some implementations, the encoded signal may be an analog voltage level that, upon decoding, represents the health of each battery strings in the intelligent power module 105. In various implementations, a power signal supplying voltage to the processing system 120 may be encoded with a data signal. When received by the processing system 120, the encoded data signal may be recovered by the A/D converter 174, and the power signal may be used for operating power. The processor 178 may decode the recovered signal to determine which battery strings are faulted. An exemplary encoding scheme is described with reference to FIG. 3.

In some implementations, the battery strings 125*a*, 125*b*, 125*c* can be recharged by the electrical energy generated from the generator 160 and an auxiliary energy source 188. For example, the generator 160 may generate more energy than needed to support operations in the processing system 120. The excess energy can then be stored in the intelligent power module 105 by charging rechargeable batteries in the intelligent power module 105. The auxiliary energy source 188 may also include solar energy, wind energy, and/or other external energy source, such as energy from a car battery.

In some embodiments, the intelligent power module 105 may also include a battery type detection circuit 190. For example, the battery type detection circuit 190 may determine whether rechargeable battery strings, such as lithium battery strings, are present in the intelligent power module 105. In some implementations, the battery type detection circuit 190 may determine the presence of a lithium battery string by measuring the output voltage of the battery strings. Because lithium batteries may have different voltage characteristics than other types of batteries, such as having higher voltage output than alkaline batteries, the battery type detection circuit 190 can identify whether a lithium battery is present. In some embodiments, the battery type detection circuit 190 may adjust one or more parameters in the intelligent power module 105 according to the identified battery type. For example, the battery type detection circuit 190 may set a higher reference voltage for the DC-DC converter 135.

In some implementations, the intelligent power module 105 may be coupled to an existing processing system that receives power from the two-wire link 140. For example, in an existing fluid flow system, the intelligent power module 105 may be installed by coupling the intelligent power supply 105 to the power supply 187 and by loading the check battery status code 182. The processor 178 can then perform operations in the check battery status code 182 to decode battery status signal received from the intelligent power module 105.

Figure 2:
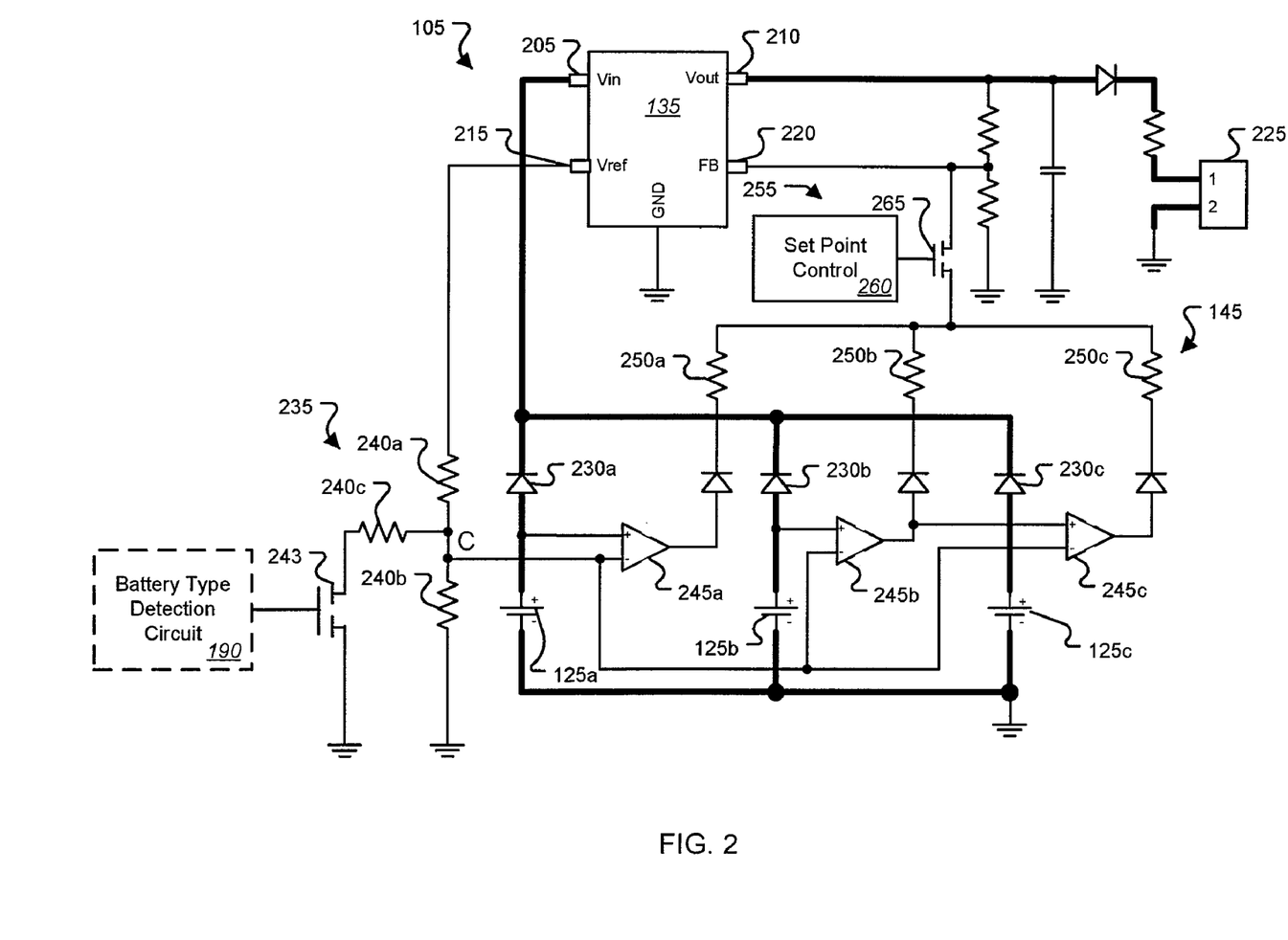
FIG. 2 shows an exemplary electrical schematic of the intelligent power module.

FIG. 2 shows an exemplary electrical schematic of one embodiment of the intelligent power module 105. The schematic includes circuitry for the battery strings 125*a*, 125*b*, 125*c*, the unidirectional current circuit 130, the DC-DC converter 135, and the battery status encoding circuit 145. In some embodiments, the intelligent battery pack 105 may be implemented using digital and/or analog hardware, which may be discrete or integrated, or a combination thereof.

In this example, the DC-DC converter 135 includes a voltage input 205, a voltage output 210, a voltage reference 215, and a feedback input 220. The DC-DC converter 135 can supply electrical power with a preferred voltage level by converting voltage received at the voltage input 205. The DC-DC converter 135 may regulate output voltage based on a signal received at the feedback input 220. In some embodiments, the DC-DC converter 135 may use a pulse-width modulation (PWM) technique that regulates output voltage using a feedback signal received at the feedback terminal 220. Other modulation schemes may also be used, such as, for example, pulse frequency modulation, hysteretic control, pulse density modulation. Switching techniques may include zero voltage, zero current, resonant, quasi-resonant, and/or a combination of these or other techniques known to those of skill in the art. The output voltage is delivered to a connector 225 that may be connected to the two-wire link 140 (FIG. 1). In this example, a reverse protection diode and series current limiting resistor are provided. In some embodiments, one or both elements may not be included, or other active and/or passive elements may be included for purposes such as current control, fusing, reverse protection, energy storage, EMI/RFI/ESD filtering, or the like.

As an example, the output voltage of the supply circuits 125*a*, 125*b*, 125*c* may vary during operation. For example, the voltage of a battery can drop due to, for example, a reduction of stored energy in the battery. A voltage drop at the voltage input 205 can cause a voltage drop in the voltage output 210. The DC-DC converter 135 can detect the voltage drop in the voltage output 210 via the feedback signal at the feedback terminal 220. The DC-DC converter 135 can then provide a voltage boost, such as by increasing the duty cycle, to the output voltage to maintain the output voltage level at a desired voltage set point (e.g., 4V, 5V, 6V, 7V, etc.).

The voltage input 205 is coupled to the unidirectional current circuit 130 that includes diodes 230*a*, 230*b*, 230*c*. In this example, each of the diodes 230*a*, 230*b*, 230*c* is connected to one of the battery strings 125*a*, 125*b*, 125*c*, respectively. The diodes 230*a*, 230*b*, 230*c* can substantially restrict the direction of current flowing through the diode. As shown, the diodes 230*a*, 230*b*, 230*c* may allow current to flow from the positive terminals of the battery strings 125*a*, 125*b*, 125*c* to the DC-DC converter 135.

In this example, the battery strings 125*a*, 125*b*, 125*c* are connected in parallel. Because the diodes 230*a*, 230*b*, 230*c* control current to flow in one preferential direction, the battery strings 125*a*, 125*b*, 125*c* can independently supply power at the voltage input 205. In some implementations, the fluid measurement system 100 can operate normally when at least one of the battery strings 125*a*, 125*b*, 125*c* is operational. For example, if the battery string 125*a* fails (e.g., causing the output voltage of that failed battery string to be substantially zero), the DC-DC converter 135 can draw power from the other battery strings 125*b* and 125*c*.

The voltage reference 205 is connected to a voltage shifting circuit 235. In this example, the voltage shifting circuit 235 can shift the voltage at a node C. The voltage shifting circuit 235 includes two resistors 240*a*, 240*b*. Depending on the ratio of the resistances at the resistors 240*a*, 240*b*, the voltage at the node C may be a substantially fixed proportion of the voltage at the voltage reference 205. When a transistor 243 turns on, the voltage at node C is shifted by the effect of current through the resistor 240*c*. In other embodiments, the voltage shifting circuit 235 may includes other components, such as voltage regulating transistors or other voltage regulators, for example. In some embodiments, the voltage shifting circuit 235 may use other well-known control mechanisms to manipulate the voltage at the node C.

In some embodiments, the intelligent power module 105 includes the battery type detection circuit 190 that may be configured to generate signals to identify battery chemistry types in the battery strings 125*a*, 125*b*, or 125*c*. In some examples, the battery type detection circuit 190 may adjust the voltage at the node C according to the battery type information. For example, the battery type detection circuit 190 may be configured to close a switch 243 when an alkaline battery type is detected. Otherwise, the battery type detection circuit 190 may open the switch 243. Closing of the switch 243 may causes voltage at the node C to decrease, which lowers a threshold signal used by the battery status encoding circuit 145.

The battery encoding circuit 145 includes comparators 245*a*, 245*b*, 245*c*. The comparators 245*a*, 245*b*, 245*c* each have two inputs. One input is coupled to the threshold signal from the node C, and the other input is coupled to the battery strings 125*a*, 125*b*, 125*c*, respectively. The output of the comparators 245*a*, 245*b*, 245*c* each connect to an anode of a diode and a series resistor 250*a*, 250*b*, 250*c*, respectively. As an example, the comparators 245*a* may generate a high output voltage at the comparator output when the battery voltage of the battery string 125*a* is higher than the voltage at the node C, and a low voltage when the battery voltage is lower than the voltage at the node C. Each output of the comparators 245*a*, 245*b*, 245*c* is connected to resistors 250*a*, 250*b*, 250*c*, respectively, via a diode. The resistors 250*a*, 250*b*, 250*c* may be binary weighted, for example, to facilitate decoding. The resistors 250*a*, 250*b*, 250*c* are connected to a common node that is selectively connected to the feedback input 220 through a switch 265. Depending on the outputs of the comparators, the feedback input 220 receives different feedback signals voltages depending on the status of the battery strings 125*a*, 125*b*, 125*c*. For example, when the battery string 125*b* is faulted such that the battery voltage at the battery string 125*b* is lower than the voltage at the node C, the comparator 245*b* may generate a low voltage at the comparator output. The low voltage at the comparator output of the comparator 245*b* decreases current to the node connected to the feedback input 220. The DC-DC converter 135 responds to the change by adjusting the voltage level at voltage output 210. For example, the DC-DC converter 135 may increase the voltage output 210 when current flowing to the feedback input 220 decreases.

In some embodiments, the battery status encoding circuit 145 includes the resistors 250*a*, 250*b*, 250*c* that may have different resistances. The different resistances may generate an encoded signal at the feedback input 220. For example, the resistances of the resistors 250*a*, 250*b*, 250*c* may be 10 KOhm, 20 KOhm, and 40 KOhm, respectively. When one or more of the battery strings 125*a*, 125*b*, 125*c* are faulted, the current flowing from the circuit 145 to the feedback input 220 decreases. For each combination of faulted battery strings, the circuit 145 may cause a unique level of current to flow to the node connected to the feedback input 220. In response to the unique current levels from the circuit 145, the voltage level at the voltage output 210 may regulate to correspondingly unique levels. When received via the two-wire link 140, the A/D converter on the processing system 120 can be operated to identify which battery strings are faulted by decoding the output voltage level. An exemplary decoding scheme is described with reference to FIG. 3.

In some embodiments, such as that depicted in FIG. 2, the intelligent power module 105 also includes a set point selection circuit 255 to periodically disconnect the circuit 145 from the node connected to the feedback input 220. The nominal set point voltage may vary from unit to unit, and may drift over time and temperature, for example. The set point selection circuit 255 may mitigate the effects of variations in the nominal output voltage by recording a nominal voltage condition using the A/D converter 174 (FIG. 1).

When the set point selection circuit 255 temporarily disconnects the circuit 145, the node connected the Vout pin 210 will transition to a nominal set point voltage. The A/D 174 captures the nominal voltage value, which is then stored in a memory location by the processor. When the set point selection circuit 255 reconnects the circuit 145, the voltage captured by the A/D 174 can include incremental voltage changes relative to the nominal voltage that reflect the encoded battery status information. The analog voltage levels read by the A/D converter 174 can be compared to the nominal voltage condition to accurately determine the voltage change due to operation of the circuit 145. Accordingly, the set point control 255 may improve the accuracy with which the processing system 120 can identify faulted battery strings from the encoded information. In some such embodiments, this improvement may facilitate increased resolution (e.g., more comparator circuits 245 in the circuit 145), improved noise margins, reduced voltage range between encoded voltage levels, reduced component costs, and/or relaxed circuit component tolerances.

The set point selection circuit 255 includes a set point control 260 and the switch 265 (e.g., junction field-effect transistor (WET), MOSFET, current mirror). In some embodiments, the set point control 260 may include a low frequency oscillator (e.g., less than 100 Hz), such as a crystal oscillator, RC oscillator, or a timer integrated circuit, that opens and closes the switch 265 periodically. In operation, the set point selection circuit 255 periodically connects the battery status encoding circuit 145 into the feedback circuit.

In some embodiments, the intelligent power module 105 may also include a multiplexer (MUX). The intelligent power module 105 may connect the MUX to reference voltage levels. During operation, the intelligent power module 105 can, through a controller circuit or the battery type detection circuit 190, for example, control which reference voltage is applied to the comparators 245a, 245b, 245c.

In some embodiments, the intelligent power module 105 may also include a time multiplexing circuit to encode multiple threshold levels for each individual battery string taken one at a time. The time multiplexing circuit may include an analog MUX that is controlled by a clock or an oscillator signal, for example. The time multiplexing circuit may allow each of the battery voltages to periodically be compared with one or more threshold voltages using one or more comparators. For example, the time-multiplexed circuit may allow the output voltage of the battery string 125a to be compared with three comparators at three different threshold voltage levels at the same time. The thresholds may be set to levels corresponding to about 80% of capacity, 25%, and 5% of capacity, for example. Any desired thresholds between 0 and 100% of capacity may be selected. In addition, any practical number of threshold voltages may be used. The output of each comparator may be connected in series with a different resistance. As a result, a state change of each comparator may cause a uniquely identifiable change in the output voltage. The processing system may be configured to decode which threshold(s) are crossed by a particular battery string that is connected to the threshold comparators via the MUX. Each threshold comparator may have different output resistance (e.g., binary weighted) so that each level can be uniquely distinguished. As a result of using multiple thresholds, the intelligent power module 105 may provide higher precision measurements of each individual battery string. To decode the information on the processing system, the processor may monitor the voltage levels output by the A/D to determine which battery string is currently being sampled. A predefined sequence may begin, for example, by controlling the output voltage level to a predetermined start level. In an alternative embodiment, a start of a sequence may be encoded by modulating the output voltage level according to a substantially unique sequence that can be recognized by the processor. In some embodiments, the unique value may be achieved by supplying a voltage out of the normal range to the threshold comparators. In other embodiments, the output voltage may be set to a predetermined level by a circuit substantially similar in operation to the set point selection circuit 255, for example, which selectively substantially disconnects the feedback circuit from the output of the threshold comparator circuit.

Upon detecting that the voltage level from the serial link has been modulated according to the defined start level or sequence, the processor may wait a predetermined time (e.g., corresponding to less than a period of the oscillator controlling the MUX) before reading the output of the threshold comparator circuit, which is then connected by the MUX to a first of the battery strings. During successive periods of the MUX oscillator, the processor reads the voltage encoded on the supply voltage, and stores the value as being associated with each corresponding battery string that is then connected to the threshold comparators by the MUX. In some embodiments, the output voltage may be pulled to a unique high or low value between reading periods when the MUX is connected to one of the battery strings, so long as a unique start or stop value, for example, is available for synchronization purposes.

As the processor reads the value corresponding to each battery string, it can determine and record which if any of a number of threshold levels that battery string exceeds. As such, various embodiments may encode the output voltage level with multi-level information about each individual battery string.

In some further embodiments, one or more multiplexed time slots may be allocated to encode information other than battery string voltages. For example, circuitry may be provided to indicate cell type information, which may be used in connection with determining whether re-charging may be attempted. As further examples, temperature and DC-DC converter current information may be encoded using the above-described analog MUX.

Figure 3:
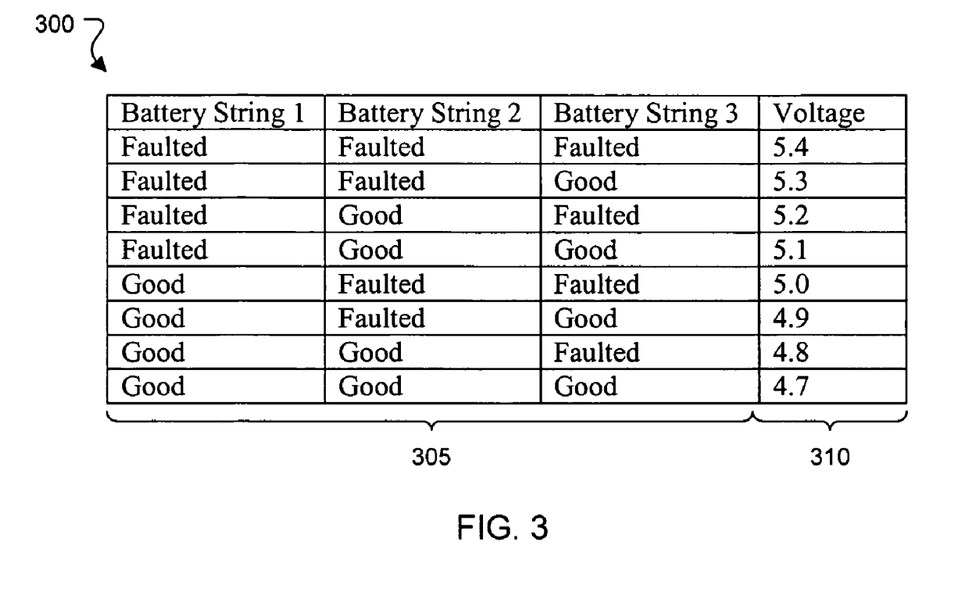
FIG. 3 is an exemplary battery status table for decoding the encoded battery status signal.

FIG. 3 shows an exemplary decoding table 300 of the signal generated by the intelligent power module 105. The decoding table 300 includes status entries 305 of the battery strings 125a, 125b, 125c and value levels 310 for each status. In some embodiments, the decoding table 300 may be stored in the NVM 180. When the processor 178 is checking the status of the battery strings 125a, 125b, 125c, the processor may decode the signals received from the intelligent power module 105 using the table. In some implementations, the decoding table may be static and determined before executing the check battery status code 182. In other implementations, the processor 178 can dynamically determine the voltage levels 310 when the processor 178 is performing the check battery status code 182 by adjusting the voltage values to reflect the set point voltage as a periodically provided by operation of the set point selection circuit 255.

As an example, the processing system 120 may receive a voltage at 5.2V from the intelligent power module 105 when the processor 178 is executing the check battery status code 182. In some embodiments, the received voltage may be digitized by the A/D converter 174 and received by the processor 178. The processor 178 can then look up the value entries 310 and determined that a battery string 1 and a battery string 3 are faulted.

Figure 4:
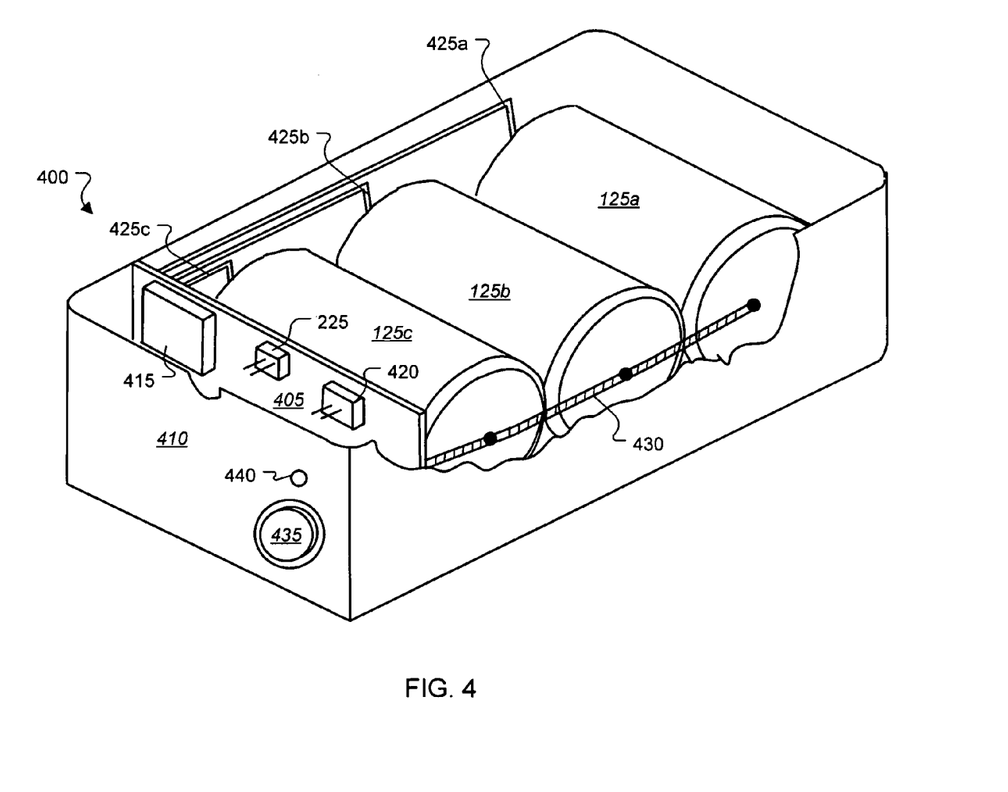
FIG. 4 shows an exemplary configuration of the intelligent power module.

FIG. 4 shows an exemplary configuration 400 of the intelligent power module 105. The configuration 400 includes a circuit board 405 and the battery strings 125a, 125b, 125c that are installed in a housing 410. The intelligent power module 105 supplies power from the battery strings 125a, 125b, 125c to the connector 225 via the circuit board 405. The connector 225 connects to the two-wire link 140.

The circuit board 405 of this example includes an electrical circuit 415 and an auxiliary power connector 420. In some embodiments, more than one circuit board, or flex circuit, may be included in the housing 410. The intelligent power module 105 can obtain external power through the auxiliary power connector 420. As an example, an external power source may be connected to the auxiliary power connector 420 to charge the battery strings 125a, 125b, 125c or to provide temporary or auxiliary power during battery replacement.

The circuit board 405 connects to the battery strings 125a, 125b, 125c via conducting strips 425a, 425b, 425c at the positive terminals and a conducting strip 430 at the negative terminals. Current flows from the battery strings 125a, 125b, 125c to the circuit 415 via the conducting strips 425a, 425b, 425c respectively. The circuit 415 transmits a regulated voltage with encoded battery strings status information to the processing system 120 via the power connector 225. In various embodiments, analog or digital encoding may be used.

The configuration 400 also includes a push button 435 and an LED light 440. In some embodiments, the push button 435 and the LED light may provide a user interface for testing the battery strings 125a, 125b, 125c. For example, the intelligent power module 105 may include logic circuits that check the status of the battery strings 125a, 125b, 125c when the push button 435 is pressed. The intelligent power module 105 can use the LED light 440 to communicate the battery status to the user. For example, the logic circuits can use blink, color, or flash codes to represent which battery is faulted. As an example, the logic circuits may display three blinks of light with a period of solid light to represent that the battery string 125c is faulted and a solid light may represent that all battery strings 125a, 125b, 125c are operational.

The intelligent power module 105 may also include a cover (not shown). The cover can substantially prevent contamination from entering the housing 410. In some embodiments, the cover may include solar panels that may convert solar energy to electricity to charge the battery strings 125a, 125b, 125c, for example, by delivering power to a charger circuit through edge contacts or the auxiliary power connector 420.

Figure 5A:
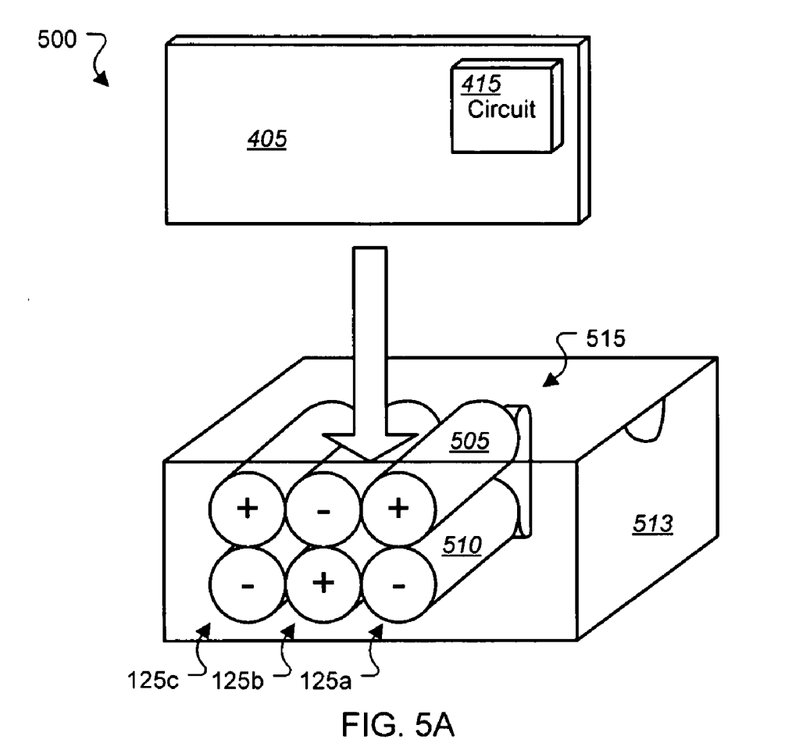
FIGS. 5A-5B collectively show an exemplary configuration of the intelligent power module, including a resilient conductive clip structure.
Figure 5B:
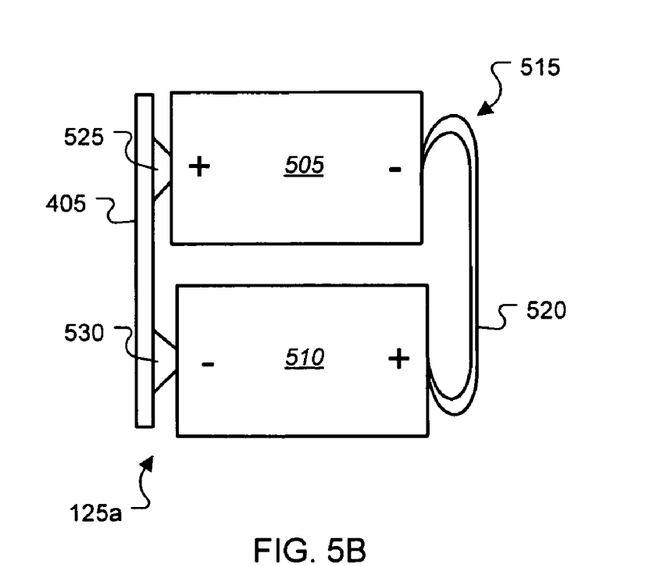

FIGS. 5A-5B collectively illustrate another exemplary package 500 that includes a flexible arrangement of supply circuits to supply an embodiment of the circuit board 405, which supports the intelligent power module 105. In the example depicted in FIG. 5A, the supply circuits are the battery strings 125a, 125b, 125c, each of which includes two battery cells 505, 510 in a battery configuration 515. The battery configuration 515 and the circuit board 405 are depicted in a side view in FIG. 5B. The circuit board 405 is installed in a housing 513 to make direct electrical contact with the battery strings 125a, 125b, 125c. The circuit board 405 includes contacts 525 to make direct electrical contact with the terminals of each of the battery strings 125a, 125b, 125c. In various embodiments, the package 500 structure can be modified to accommodate any practical number and combination of series and/or parallel cells in each battery string and any practical number of parallel battery strings.

When installed in the package 500, the intelligent power module 105 may be operable to supply power to the processing system 120 if at least one suitably charged battery string 125a or 125b or 125c is installed. As such, batteries may be hot swapped if not all the batteries are removed from the package 500. In addition, stored energy (e.g., capacitance) on the circuit board 405 and/or the processing system 120 may provide some temporary operational energy during maintenance, or when the supply circuits otherwise substantially fail to supply sufficient operating power to the processing system 120.

As shown in FIG. 5B, the battery configuration 515 includes a battery connecting structure 520. For example, the battery connecting structure 520 may be a resilient conductive clip, such as a metal spring clip, that can urge the battery cells 505, 510 toward contacts 525, 530 on the circuit board 405. In some embodiments, the battery connecting structure 520 is configured with sufficient surface area to keep the battery cells 505, 510 in substantially continuous contact with the conducting receptacles 520 and to maintain electrical contact with the battery cells 505, 510 even if the cells 505, 510 are shifted due to vibration. Features may be stamped and/or otherwise formed in the connecting structure 520 to reduce intermittent electrical contact that may result, for example, from vibration, impact, contamination, or a combination of such factors.

Figure 6:
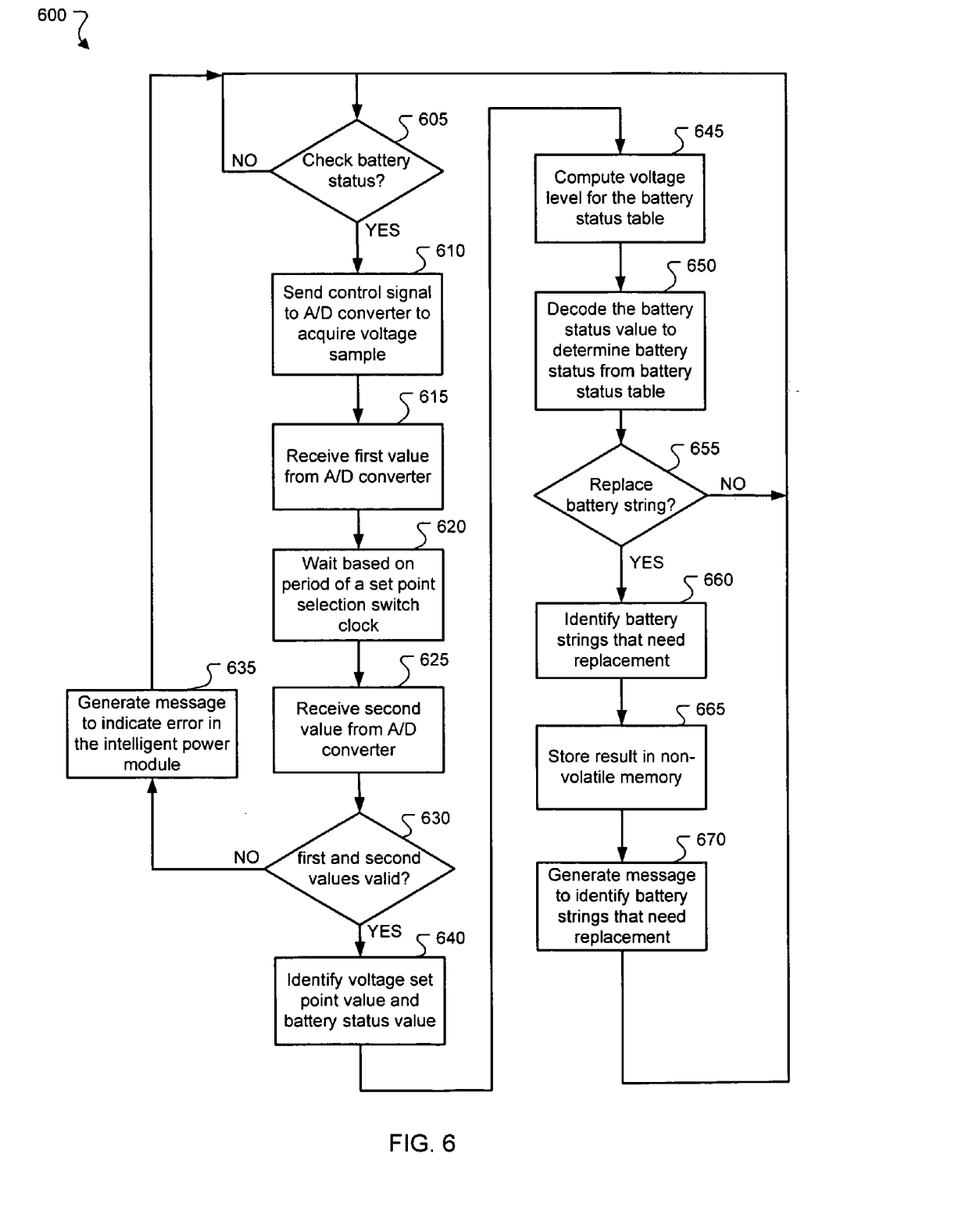
FIG. 6 is a flow chart showing exemplary operations for checking battery status.

FIG. 6 shows a flow chart that illustrates an exemplary method 600 of operations for checking the status of the battery strings 125a, 125b, 125c. The method 600 includes operations that may be performed generally by the processor 178 when executing. The operations may be implemented in the check battery status code 182. In other embodiments, other code or codes can be implemented to perform functions of the method 600. Operations may also be supplemented or augmented by other processing and/or control elements that may be incorporated by the bus 176 or the COM port 184. Some or all of the operations may be performed by one or more processors executing instructions tangibly embodied in a signal. The processing may be implemented using analog and/or digital hardware or techniques, either alone or in cooperation with one or more processors executing instructions.

The method 600 begins at step 605 when the processor 178 determines whether it is time to check battery status. In some embodiments, the processor 178 may check the battery status periodically, such as hourly or daily. In other embodiments, the processing system 120 may include a battery status bit that is configured to set when a change in the operating point of the intelligent power module 105 is detected. In other embodiments, the processor 178 may check battery status when the processing system 120 receives a command from an external device to execute the check battery status code 182. The processor 178 may execute the check battery status code 182 when the battery status bit is set. At step 605, if the processor 178 determines that it is not the time to check battery status, then the step 605 repeats. If the processor 178 determines that it is the time to check battery status, then, at step 610, the processor 178 sends a control signal to the A/D converter 174 to acquire a voltage measurement of voltage supplied by the intelligent power module 105.

Next, the processor 178 receives at step 620 a first value from the A/D converter 174. The processor 178 then waits based on a period of the set point selection control 260 at step 620. After waiting period, the processor 178 receives a second value from the A/D converter 174 at step 625. For example, the set point selection control 260 may have a period of 10 ms. Then, after the processor 178 receives the first value, the processor 178 may receive the second value after 10 ms.

At step 630, the processor 178 may determine whether the first and the second values are valid. For example, the processor 178 may check the received values against an upper threshold and a lower threshold. If the received values are between the upper threshold and the lower threshold, then the received values are valid. If the processor 178 determines, at step 630, that one or both of the first and the second values are not valid, then the processor 178 may generate a message at step 635 to indicate an error in the intelligent power module 105 and the step 605 is repeated. As an example, the processor 178 may send an email or a text message, through the COM port 184, to a maintenance user to notify the maintenance user that the intelligent power module 105 may be malfunctioning. As another example, the processor 178 may display an alert message at the display 186.

If the processor 178 determines that both of the first and the second values are valid at step 630, then the processor 178 can identify, at step 640, a voltage set point value and a battery status value. For example, the processor 178 may compare the first value and the second value. Then the processor 178 sets the greater of the two values to be the voltage set point value and the smaller of the two values to be the battery status value. Next, at step 645, the processor 178 can use the voltage set point value to compute voltage levels representing the battery status in the battery status table 300. In one embodiment, the processor 178 may compute a voltage level for each of the status entries 305. After computing the values for the battery status table 300, the processor 178 decodes the battery status value to determine a battery status from the battery status table 300 (FIG. 3) at step 650. In another embodiment, the processor 178 may compute an upper threshold voltage and a lower threshold voltage for each of the status entries 305. The processor 178 may then determine a battery status by comparing the battery status value to the computed voltage thresholds.

At step 655, the processor 178 checks whether it is necessary to replace one or more battery strings. In some embodiments, the processor 178 may determine that it is necessary to replace the battery strings when a predefined number of faulted battery strings are present in the intelligent power module 105. In other embodiments, the processor 178 may compute an expected duration before all battery strings in the intelligent power module 105 are faulted based on, for example, the rate of change of the number of faulted battery strings. If the expected duration is less than a threshold, such as a week, then the processor 178 may determine that it is necessary to replace the faulted batteries. If the processor 178 determines, at step 655 that it is not necessary to replace the battery strings, then step 605 is repeated.

If the processor 178 determines that it is necessary to replace the battery strings at step 655, then the processor 178 identifies, at step 660, the faulted battery strings that need replacement. For example, the processor 178 can identify the faulted battery strings from the battery status table 300. At step 665, the processor 178 can store the results, such as which battery strings are faulted, in the NVM 180. In some embodiments, the processor 178 may also store a time stamp (e.g., using a real time clock), or the present meter value, associated with the results, so a user can trace the battery status associated with time. Next, the processor 178 generates a message to identify battery strings that need replacement at step 670, and then step 605 is repeated. In some implementations, the processor 178 may cause the message information to be transmitted externally via the COM port 184. In various implementations, communication with other computing devices via the COM port 184 may be accomplished using any suitable standard or proprietary wired (e.g., USB, RS-232/485, Firewire) or wireless (e.g., infrared, AM, FM, Bluetooth, wireless LAN) protocols and apparatus.

Although an exemplary flow measurement system 100 has been described with reference to FIG. 1, other implementations may be deployed in other remote, industrial, commercial, and/or residential fluid flow measurement applications.

In some embodiments, the module 105 may be coupled to the processing system 120 through an electrical interface to transfer power signals using at least two wires. Some examples may use multiple ground conductors. One or more conductors may include a shielding conductor, which may be braided, solid, or stranded, a substantially planar conductor, or a combination of such conductors. Multiple conductors may be used for ground, power, or other signals. Conductors may be, as illustrative examples, in twisted pair, coaxial, multi-filar, flat conductor, ribbon cable, shield or unshielded, stripline, controlled impedance, or other format, or in a combination of these. In some embodiments, a data interface may be included in a wiring assembly with a power interface, but may use a different circuit path. In some examples, the data path may include a wireless portion, using infrared or electromagnetic signals to transfer information between the processing system 120 and the intelligent power module 105. Such information may be encoded in serial or digital format, and the transfer may be packet-based.

In some embodiments, data signals from the power module 105 may be processed directly or indirectly, including without an analog-to-digital conversion, when received on the processing system 120. Appropriate buffering or filtering may be used to process the data signals. Processing may be done in hardware and/or software using techniques well known to those of ordinary skill in the art.

In various embodiments, the processing system 120 or the intelligent power module 105 may communicate using suitable communication methods, equipment, and techniques. For example, the module 105 may communicate with a portable computer using point-to-point communication in which a message is transported directly from the source to the receiver over a dedicated physical link (e.g., fiber optic link, point-to-point wiring, and daisy-chain). Other embodiments may transport messages by broadcasting to all or substantially all devices that are coupled together by a communication network, for example, by using omni-directional radio frequency (RF) signals, while still other embodiments may transport messages characterized by high directivity, such as RF signals transmitted using directional (i.e., narrow beam) antennas or infrared signals that may optionally be used with focusing optics. Still other embodiments are possible using appropriate interfaces and protocols such as, by way of example and not intended to be limiting, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In some embodiments, the module 105 may include a processor and memory to execute various encoding and or battery monitoring, load leveling, or re-charge functions (e.g., trickle charge, fast charge). Various modules 105 may be programmed with the same information and be initialized with substantially identical information stored in non-volatile memory. In other embodiments, one or more modules 105 may be custom configured to perform specific functions. For example, an A/D converter function may be provided to facilitate encoding, cell type detection, charging algorithms, or other functions that will be apparent to those of ordinary skill in the art.

In some embodiments, the DC-DC converter 135 may operate in a hysteretic mode to regulate the voltage at the output substantially between a lower threshold voltage and an upper threshold voltage. The batteries may be hot swappable in that the module is operable to supply uninterrupted power to the processing system so long as at least one viable battery string is installed.

Temporary auxiliary energy inputs may be received, for example, to re-charge batteries. Some embodiments may operate with other DC voltage sources, such as 9V (nominal) batteries, for example. Alternating current (AC) inputs, which maybe provided, for example from a 50/60 Hz power port, or from a portable electric generator, may be received via a rectifier and appropriate scaling. Provision for AC (e.g., sine wave, square wave, triangular wave, etc . . . ) inputs may include a line frequency transformer to perform isolation, step-up, or step-down.

A number of embodiments of the invention have been described. Nevertheless, it will be understood that various modifications may be made without departing from the spirit and scope of the invention. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof. Accordingly, other embodiments are within the scope of the following claims.

What is claimed is:

1. An intelligent power module for providing power to a fluid flow totalizer, the module comprising:
 a processor configured to generate a signal that represents a measure of a flow of a fluid in response to a signal received from a fluid flow sensor;
 a plurality of supply circuits, each supply circuit comprising at least one energy storage cell in series with a unidirectional flow element to substantially limit current flow through each of the supply circuits to a preferred direction; and
 a switched mode power supply comprising an input coupled to draw power from any of the supply circuits and an output to deliver power to the processor, the power supply providing a voltage boost when a voltage at the input is lower than a desired voltage at the output.

2. The module of claim 1, wherein the fluid flow sensor comprises a gas volume meter.

3. The module of claim 1, wherein the fluid flow sensor comprises a liquid flow meter.

4. The module of claim 1, wherein the liquid flow meter comprises a member of the group consisting of a turbine, a diaphragm, and an orifice flow meter.

5. The module of claim 1, wherein the processor corrects the output signal based upon temperature or pressure information.

6. The module of claim 1, further comprising a plurality of receptacles to receive and retain a plurality of stored energy cells.

7. The module of claim 1, wherein a plurality of the supply circuits are substantially connected in parallel.

8. The module of claim 1, wherein at least one of the supply circuits comprises one or more energy storage cells connected in series.

9. The module of claim 1, wherein the unidirectional flow element comprises a diode.

10. The module of claim 1, the power supply operates in a hysteretic mode to regulate the voltage at the output substantially between a lower threshold voltage and an upper threshold voltage.

11. The module of claim 1, further comprising means for determining status information for each of a plurality of cells in the plurality of supply circuits.

12. The module of claim 1, wherein the energy storage cells comprise at least one alkaline battery.

13. The module of claim 1, wherein the energy storage cells comprise at least one lithium battery.

14. The module of claim 1, wherein at least one of the supply circuits is hot-swappable.

15. The module of claim 1, further comprising means for sending an indication of the status of individual energy storage cells to be received by the processor.

16. The module of claim 15, wherein the sending means comprises an electrical interface that comprises two wires to transfer a power signal.

17. The module of claim 16, wherein the sending means further comprises at least one additional wire to transfer a data signal.

18. The module of claim 1, further comprising means for adjusting the output voltage to encode information to identify faulted supply circuits.

19. The module of claim 18, wherein the information to identify faulted supply circuits comprises parallel-encoded digital information.

20. The module of claim 18, wherein the information to identify faulted supply circuits comprises serially-encoded digital information.

21. The system of claim 20, further comprising means for decoding the energy source status information while using the power signal as a source of operating electrical power.

22. A fluid flow metering system, comprising:
a fluid flow meter;
a processing system to accumulate fluid flow measurement data from the fluid flow meter; and
an intelligent power module coupled to the processing system by an electrical link to transfer power therebetween, the power module supplying power received from any of a plurality of battery strings comprising one or more batteries, each battery string supplying current through a corresponding current steering element having a preferred current direction.

23. The system of claim 22, wherein each of the current steering elements comprises a rectifying element in series with the corresponding battery string.

24. The system of claim 22, wherein the electrical link comprises two wires.

25. The system of claim 24, wherein the electrical link further comprises at least one additional wire to transfer a data signal.

26. The system of claim 22, further comprising means for adjusting the output voltage to encode information to identify faulted battery strings.

27. The system of claim 26, wherein the information to identify faulted battery strings comprises serially-encoded digital information.

28. The system of claim 26, wherein the information to identify faulted battery strings comprises parallel-encoded digital information.

29. A fluid flow metering system, comprising:
a fluid flow sensor;
a processing system to accumulate fluid flow measurement data from the fluid flow sensor; and
means for generating a power signal encoded with energy source status information to the processing system over a two wire link.

* * * * *